(12) United States Patent
Sasaki

(10) Patent No.: US 8,669,934 B2
(45) Date of Patent: Mar. 11, 2014

(54) DRIVING CIRCUIT FOR LIGHT EMITTING DEVICE WITH OVERCURRENT PROTECTION

(75) Inventor: Yoshikazu Sasaki, Kyoto (JP)

(73) Assignee: Rohm Co., Ltd. (JP)

( * ) Notice: Subject to any disclaimer, the term of this patent is extended or adjusted under 35 U.S.C. 154(b) by 213 days.

(21) Appl. No.: 13/224,453

(22) Filed: Sep. 2, 2011

(65) Prior Publication Data

US 2012/0075544 A1 Mar. 29, 2012

(30) Foreign Application Priority Data

Sep. 7, 2010 (JP) .................................. 2010-200202

(51) Int. Cl.
*G09G 3/34* (2006.01)

(52) U.S. Cl.
USPC ........................................................ 345/102

(58) Field of Classification Search
USPC .................. 323/273, 277, 282, 284; 327/400; 345/89, 90, 100, 690; 361/93.1; 363/21.12, 56.1
See application file for complete search history.

(56) References Cited

U.S. PATENT DOCUMENTS 6,747,504 B2 * 6/2004 Simpson et al. ............... 327/400
7,081,742 B2 * 7/2006 Ito et al. ......................... 323/273

FOREIGN PATENT DOCUMENTS

JP 2009-261158 A 11/2009

* cited by examiner

*Primary Examiner* — Dwayne Bost
*Assistant Examiner* — Sepehr Azari
(74) *Attorney, Agent, or Firm* — Cantor Colburn LLP

(57) ABSTRACT

A driving circuit is provided, which is configured to supply a driving voltage and a driving current to an LED string. A first detection resistor is arranged on a path of the LED string. A voltage source outputs a control voltage having a level that corresponds to the target luminance level of the LED string, and a first threshold voltage that is proportional to the control voltage. A controller generates a gate pulse signal having a duty ratio that is adjusted such that the voltage drop across the first detection resistor matches the control voltage. A first driver drives a switching transistor of a DC/DC converter according to the gate pulse signal. When the voltage drop across the first detection resistor exceeds the first threshold voltage, a first comparator stops the switching operation of the switching transistor.

10 Claims, 3 Drawing Sheets

DRIVING CIRCUIT FOR LIGHT EMITTING DEVICE WITH OVERCURRENT PROTECTION

BACKGROUND OF THE INVENTION

1. Field of the Invention

The present invention relates to a driving technique for a light emitting element, and particularly to an overcurrent protection technique for such an element.

2. Description of the Related Art

In recent years, as a backlight of a liquid crystal panel or as an illumination device, a light emitting apparatus is employed, which is configured using a light emitting element such as an LED (light emitting diode) or the like. FIG. 1 is a circuit diagram which shows an example configuration of a light emitting apparatus according to a comparison technique. A light emitting apparatus 1003 includes an LED string 6, and a switching power supply 1004.

The LED string 6 includes multiple LEDs connected in series. The switching power supply 1004 is configured to step up an input voltage Vin input to an input terminal P1 so as to output a driving voltage Vout to one terminal of the LED string 6 connected to an output terminal P2.

The switching power supply 1004 includes an output circuit 102 and a control IC 1100. The output circuit 102 includes an inductor L1, a switching transistor M1, a rectifier diode D1, and an output capacitor C1. The control IC 1100 adjusts the driving voltage Vout by controlling the on/off duty ratio of the switching transistor M1.

A PWM dimming switch (transistor) M2 and a current detection resistor R1 are arranged on a path of the LED string 6. A controller 1010 generates a PWM dimming pulse signal G2 having a duty ratio that is controlled according to the target luminance level. A driver DR2 performs switching of the PWM dimming switch M2 according to the pulse signal G2.

A voltage drop (detection voltage) $V_{R1}$, which is proportional to the driving current $I_{DRV}$ that flows through the LED string 6, occurs at the detection resistor R2. An error amplifier EA1 amplifies the difference between the detection voltage $V_{R1}$ and the control voltage $V_{REF}$ so as to generate a feedback voltage $V_{FB}$. The controller 1010 generates a gate pulse signal G1 that is subjected to pulse modulation according to the feedback voltage $V_{FB}$. A driver DR1 performs switching of the switching transistor M1 according to the gate pulse signal G1.

With such a configuration, feedback control is performed such that the relation $I_{DRV}=V_{REF}/R2$ holds true, thereby allowing the LED string 6 to emit light with a luminance level that corresponds to the control voltage $V_{REF}$.

RELATED ART DOCUMENTS

Patent Documents

[Patent Document 1]
Japanese Patent Application Laid Open No. 2009-261158

In the light emitting apparatus 1003, overcurrent detection is performed in order to protect the circuit elements thereof. A comparator CMP1 compares the detection voltage $V_{R1}$ with a predetermined threshold voltage $V_{TH1}$. When $V_{R1}>V_{TH1}$, i.e., when an overcurrent state in which the driving current $I_{DRV}$ exceeds a predetermined threshold is detected, the comparator CMP1 asserts (switches to high level) an overcurrent detection signal OCP1. When the overcurrent detection signal OCP1 is asserted, the controller 1010 sets the gate pulse signal G1 to low level so as to turn off the switching transistor M1.

Furthermore, the detection resistor R2 is arranged on a path of the switching transistor M1. A voltage drop (detection voltage $V_{R2}$), which is proportional to the current $I_{L1}$ that flows through the inductor L1, occurs at the detection resistor R2. A comparator CMP2 compares the detection voltage $V_{R2}$ with a predetermined threshold voltage $V_{TH2}$. When $V_{R2}>V_{TH2}$, i.e., when an overcurrent state in which the coil current $I_L$ exceeds a predetermined threshold value is detected, the comparator CMP2 asserts an overcurrent detection signal OCP2. When the overcurrent detection signal OCP2 is asserted, the controller 1010 sets the gate pulse signal G1 to low level so as to turn off the switching transistor M1.

With conventional techniques, the threshold voltages $V_{TH1}$ and $V_{TH2}$ are each set according to the maximum rated currents of the inductor L1, LED, and PWM dimming switch M2, and are each fixed at a constant value regardless of the amount of driving current $I_{DRV}$.

SUMMARY OF THE INVENTION

The present inventor has investigated such a light emitting apparatus 1003, and has come to recognize the following problem. With conventional circuits, the purpose of such an arrangement is only to protect the circuit elements. Accordingly, such an arrangement tolerates a very large amount of current flow, to the extent that it does not exceed the maximum rated current. That is to say, in such an arrangement, excessive current can flow beyond the necessary flow of current. Accordingly, there is room for further reduction of power consumption.

The present invention has been made in order to solve such a problem. Accordingly, it is an exemplary purpose of an embodiment of the present invention to provide a control circuit which is capable of reducing power consumption while protecting the circuit in a sure manner.

An embodiment of the present invention relates to a driving circuit configured to supply a driving voltage and a driving current to a light emitting element. The driving circuit comprises: a first detection resistor arranged on a path of the light emitting element; a voltage source configured to output a control voltage having a level that corresponds to a target luminance level of the light emitting element, and a first threshold voltage that is proportional to the control voltage; a controller configured to generate a gate pulse signal having a duty ratio that is adjusted such that the voltage drop across the first detection resistor matches the control voltage; a driver configured to drive, according to the gate pulse signal, a switching power supply configured to generate the driving voltage; and a first comparator configured to assert a first overcurrent detection signal when the voltage drop across the first detection resistor exceeds the first threshold voltage, so as to stop a switching operation of the switching power supply.

With such an embodiment, with the resistance value of the first detection resistor as R1, and with the control voltage as $V_{DIM}$, the target value of the driving current $I_{DRV}$ is represented by $I_{DRV}'=V_{DIM}/R1$.

Furthermore, when the first threshold voltage $V_{TH1}$ is represented by $V_{TH1}=V_{DIM}\times K1$ using a proportional constant K1, the threshold current $I_{TH1}$ for detecting the overcurrent state is represented by $I_{TH1}=V_{DIM}\times K1/R1$. That is to say, such an arrangement provides the threshold current $I_{TH1}$ that is proportional to the target value $I_{DRV}'$ of the driving current.

That is to say, in addition to safely protecting the circuit, such an arrangement provides a reduction in power consumption as compared with an arrangement in which the threshold current is fixed at a high-level threshold.

Also, the voltage source may be configured to further output a second threshold voltage that is proportional to the control voltage. Also, the driving circuit may further comprise: a second detection resistor arranged on a path of a switching element of the switching power supply; and a second comparator configured to assert a second overcurrent detection signal so as to turn off the switching element when a voltage drop across the second detection resistor exceeds the second threshold voltage.

Such an arrangement is capable of changing, according to the driving current, the threshold used to detect an overcurrent state of the current that flows through the switching element. Thus, such an arrangement is capable of providing a reduction in power consumption while safely protecting the circuit.

Another embodiment of the present invention also relates to a driving circuit configured to supply a driving voltage and a driving current to a light emitting element. The driving circuit comprises: a voltage source configured to output a control voltage having a level that corresponds to a target luminance level of the light emitting element, and a first threshold voltage that is proportional to the control voltage; a transistor and a first detection resistor arranged in series on a path of the light emitting element; an error amplifier configured to adjust the voltage at a control terminal of the transistor such that voltage drop across the first detection resistor matches the control voltage; a controller configured to generate a gate pulse signal having a duty ratio that is adjusted such that the sum total of the voltage drop across the transistor and the voltage drop across the first detection resistor matches a predetermined reference voltage; a driver configured to drive, according to the gate pulse signal, a switching power supply configured to generate the driving voltage; and a first comparator configured to assert a first overcurrent detection signal so as to stop a switching operation of the switching power supply when the voltage drop across the first detection resistor exceeds the first threshold voltage.

Also, the voltage source may be configured to further output a second threshold voltage that is proportional to the control voltage. Also, the driving circuit may comprise: a second detection resistor arranged on a path of a switching element of the switching power supply; and a second comparator configured to assert a second overcurrent detection signal so as to turn off the switching element when a voltage drop across the second detection resistor exceeds the second threshold voltage.

Yet another embodiment of the present invention relates to a light emitting apparatus. The light emitting apparatus comprises: a light emitting element; and a driving circuit according to any one of the aforementioned embodiments, configured to drive the light emitting element.

Yet another embodiment of the present invention relates to an electronic device. The electronic device comprises: a liquid crystal panel; and the aforementioned light emitting apparatus arranged as a backlight of the liquid crystal panel.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

In the present specification, the state represented by the phrase "the member A is connected to the member B" includes a state in which the member A is indirectly connected to the member B via another member that does not substantially affect the electric connection therebetween, or that does not damage the functions or effects of the connection therebetween, in addition to a state in which the member A is physically and directly connected to the member B.

Similarly, the state represented by the phrase "the member C is provided between the member A and the member B" includes a state in which the member A is indirectly connected to the member C, or the member B is indirectly connected to the member C via another member that does not substantially affect the electric connection therebetween, or that does not damage the functions or effects of the connection therebetween, in addition to a state in which the member A is directly connected to the member C, or the member B is directly connected to the member C.

Figure 1:
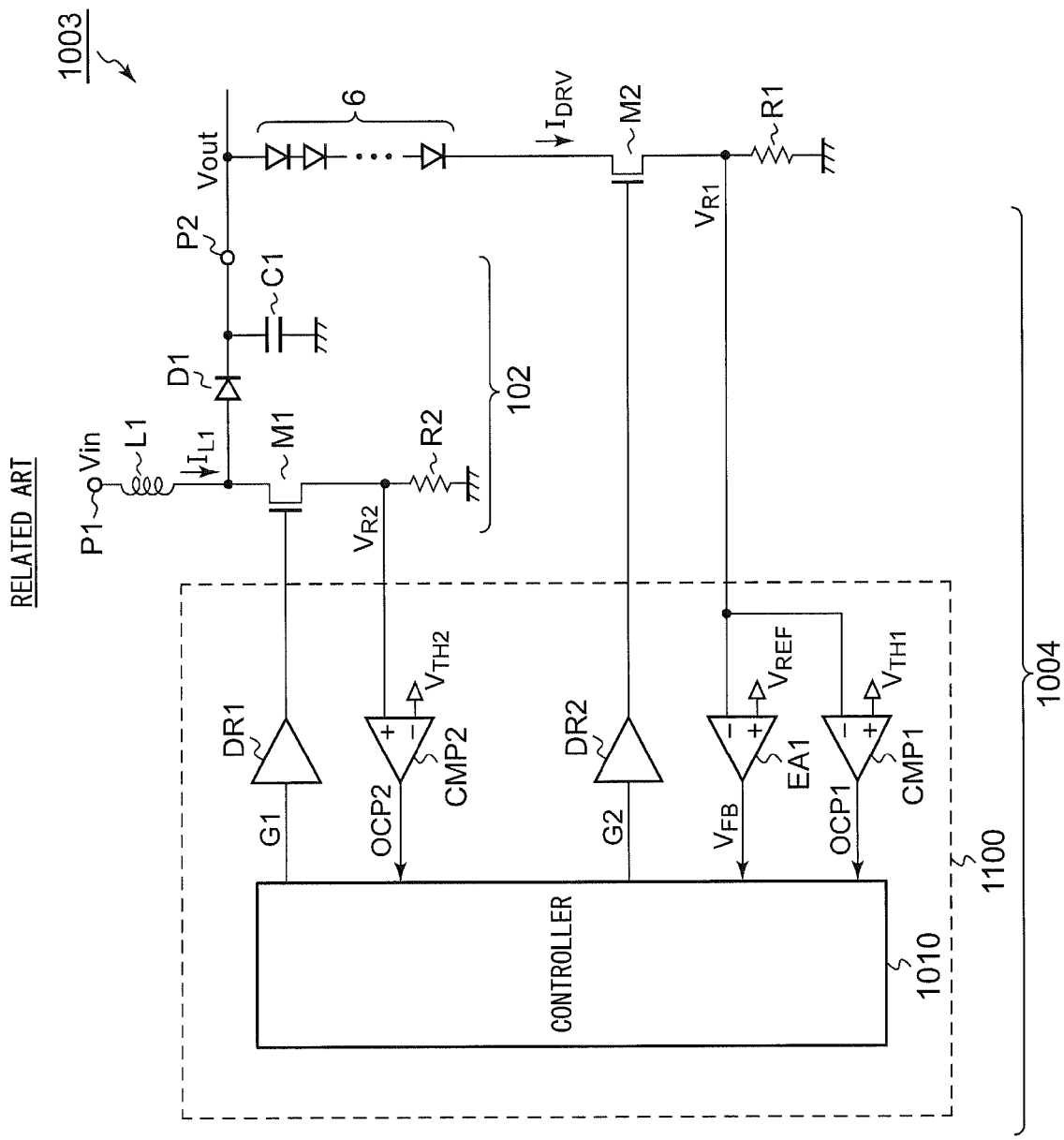
FIG. 1 is a circuit diagram which shows an example configuration of a light emitting apparatus according to a comparison technique.
Figure 2:
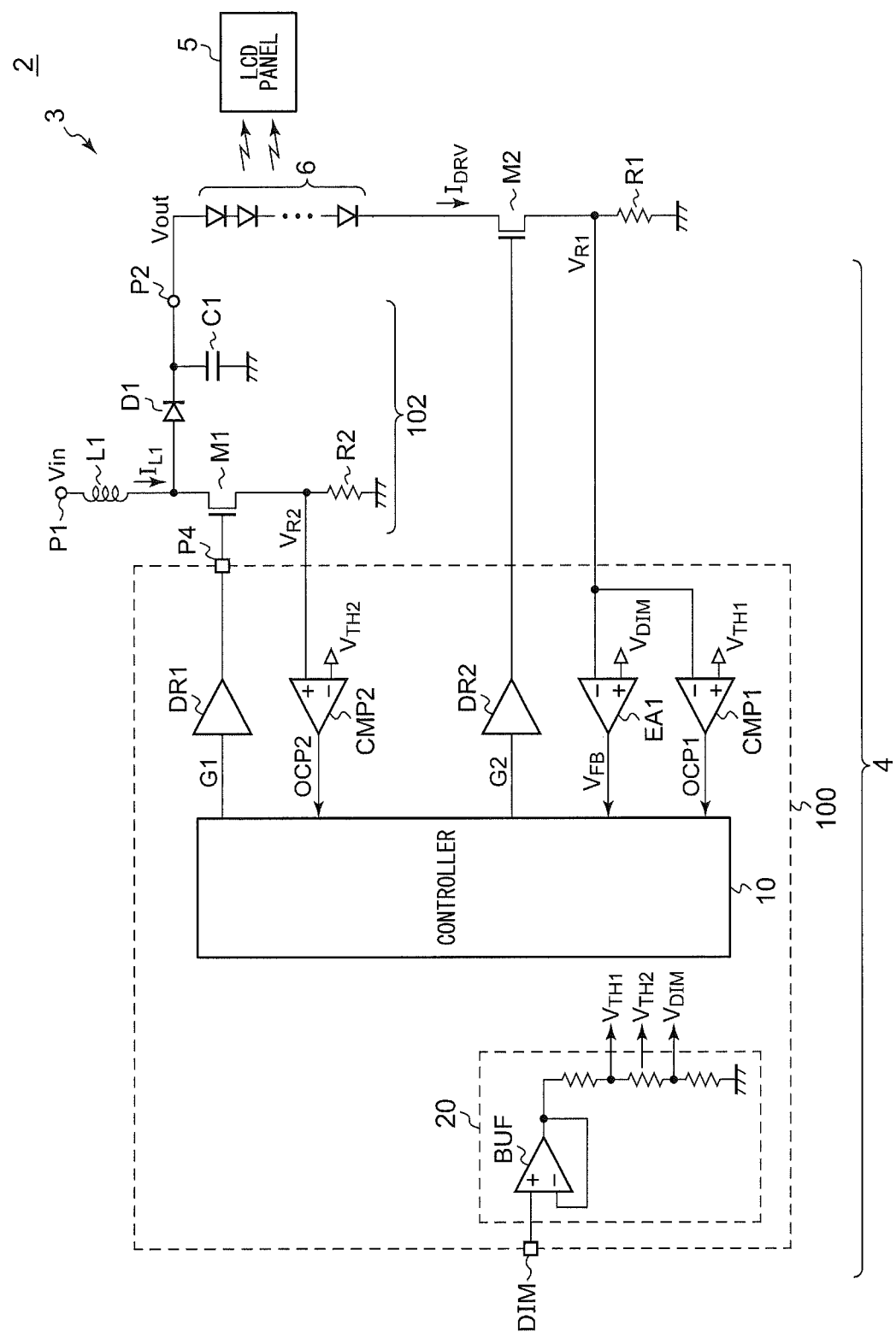
FIG. 2 is a circuit diagram which shows a configuration of an electronic device including a driving circuit according to a first embodiment of the present invention.

FIG. 2 is a circuit diagram which shows a configuration of an electronic device including a driving circuit 4 according to a first embodiment of the present invention.

An electronic device 2 is configured as battery-driven device such as a laptop PC, a digital still camera, a digital video camera, a cellular phone terminal, a PDA (Personal Digital Assistant), or the like, and includes a light emitting apparatus 3 and an LCD panel (Liquid Crystal Panel) 5. The light emitting apparatus 3 is provided as a backlight of the LCD panel 5.

The light emitting apparatus 3 includes an LED string 6 configured as a light emitting element and a driving circuit 4 for the LED string 6.

The LED string 6 includes multiple LEDs connected in series. The driving circuit 4 includes a step-up DC/DC converter, and is configured to step up the input voltage (e.g., battery voltage) Vin input via an input terminal P1 so as to output an output voltage (driving voltage) Vout via an output terminal P2. One terminal (anode) of the LED string 6 is connected to the output terminal P2.

The driving circuit 4 includes a control IC 100 and an output circuit 102. The output circuit 102 includes an inductor L1, a rectifier diode D1, a switching transistor M1, and an output capacitor C1. The output circuit 102 has a typical topology, and accordingly, description thereof will be omitted.

A switching terminal P4 of the control IC 100 is connected to the gate of the switching transistor M1. The control IC 100 adjusts the on/off duty ratio of the switching transistor M1 by means of feedback control so as to provide the output voltage Vout required to allow the LED string 6 to emit light with a target luminance level. It should be noted that the switching transistor M1 may be configured as a built-in component of the control IC 100.

A PWM dimming switch M2 is arranged on a path of the LED string 6, and specifically between the cathode of the LED string 6 and the ground terminal. By adjusting the on/off ratio (duty ratio) of the PWM dimming switch M2, such an arrangement is capable of adjusting the ratio between the on time and the off time of the LED string 6, thereby adjusting the effective luminance level of the LED string 6.

A first detection resistor R1 is arranged on a path of the LED string 6, and specifically between the cathode of the LED string 6 and the ground terminal. The control IC 100 receives, as an input signal, a control signal DIM that corresponds to the target luminance level set for the LED string 6. The control signal DIM may be configured as an analog voltage signal or may be configured as a digital signal.

A voltage source 20 receives the control signal DIM, and outputs a control voltage $V_{DIM}$ that corresponds to the control signal DIM thus received. Furthermore, the voltage source 20 generates a first threshold voltage $V_{TH1}$ and a second threshold voltage $V_{TH2}$ that are each proportional to the control voltage $V_{DIM}$. The two threshold voltages $V_{TH1}$ and $V_{TH2}$ are represented by the following expressions using proportional constants K1 and K2, respectively.

$$V_{TH1} = V_{DIM} \times K1$$

$$V_{TH2} = V_{DIM} \times K2$$

It should be noted that the constants K1 and K2 are each set to a value that is greater than 1. The constant K1 is preferably set in a range between 1.5 and 2. The constant K2 is set to a suitable value based upon the inductance value of the inductor L1 and so forth.

FIG. 2 shows a specific example configuration of the voltage source 20 in a case in which the control signal DIM is configured as an analog voltage signal. The voltage source 20 includes a buffer BUF configured to receive the control signal DIM, and multiple resistors connected in series configured to divide the output voltage of the buffer BUF. The control voltage $V_{DIM}$, and the threshold voltages $V_{TH1}$ and $V_{TH2}$ each having a proportional relation with the control voltage $V_{DIM}$, are output from the respective connection nodes (taps) that connect the multiple resistors. The dividing ratio obtained by the resistors provides the proportional constants K1 and K2, which can be readily understood by those skilled in this art.

In a case in which the control signal DIM is configured as a digital signal, the voltage source 20 may further include a D/A converter configured to convert the control signal DIM into an analog voltage signal. It should be noted that the configuration of the voltage source 20 is not restricted to such an arrangement shown in FIG. 2. Also, the voltage source 20 may have a different configuration.

An error amplifier EA1 amplifies the difference between the voltage drop $V_{R1}$ across the first detection resistor R1 and the control voltage $V_{DIM}$ so as to generate an error voltage $V_{FB}$. A controller 10 receives the error voltage $V_{FB}$, and generates a gate pulse signal G1 having a duty ratio that is adjusted such that the voltage drop $V_{R1}$ across the first detection resistor R1 matches the control voltage $V_{DIM}$. A first driver DR1 drives a DC/DC converter according to the gate pulse signal G1.

When the voltage drop $V_{R1}$ across the first detection resistor R1 exceeds the first threshold voltage $V_{TH1}$, a first comparator CMP1 asserts a first overcurrent detection signal OCP1. When the first overcurrent detection signal OCP1 is asserted, the controller 10 immediately fixes the gate pulse signal G1 to low level so as to turn off the switching transistor M1, thereby stopping the switching operation of the DC/DC converter.

A second detection resistor R2 is arranged on a path of the switching transistor M1 of the DC/DC converter. When the voltage drop $V_{R2}$ across the second detection resistor R2 exceeds the second threshold voltage $V_{TH2}$, a second comparator CMP2 asserts a second overcurrent detection signal OCP2. When the second overcurrent detection signal OCP2 is asserted, the controller 10 immediately fixes the gate pulse signal G1 to low level so as to turn off the switching transistor M1, thereby stopping the switching operation of the DC/DC converter.

The above is the configuration of the driving circuit 4. Next, description will be made regarding the operation thereof. When the light emitting apparatus 3 operates normally, the driving current $I_{DRV}$ thereof is stabilized as represented by the expression $I_{DRV} = V_{DIM}/R1$.

Now, let us consider a case in which, due to the occurrence of a certain abnormal state or malfunction, the current $I_{DRV}$ that flows through the LED string 6 exceeds the target value, and ultimately exceeds the threshold current $I_{TH1}$. In this case, the controller 10 performs an overcurrent protection operation. Specifically, the controller 10 immediately turns off the switching transistor M1, thereby stopping the supply of electric power to the LED string 6.

The advantage of the driving circuit 4 can be clearly understood by making comparison with comparison techniques. With comparison techniques, a fixed threshold current $I_{TH}$ (e.g., 200 mA) is set regardless of the target value set for the driving current $I_{DRV}$. Accordingly, in a case in which the target value of the driving current $I_{DRV}$ is small, e.g., 200 mA, such a protection operation is not performed until the current that flows through the LED string 6 exceeds 200 mA, leading to needless current consumption.

In contrast, with the driving circuit 4 shown in FIG. 2, the threshold current $I_{TH1}$ used to detect the overcurrent state is represented by $I_{TH1} = V_{DIM} \times K1/R1$. That is to say, the threshold current $I_{TH1}$ dynamically changes following the target value of the driving current, i.e., $V_{DIM}/R1$. For example, in a case in which K1=1.5, and the target value of the driving current $I_{DRV}$ is 20 mA, the threshold current $I_{TH1}$ is set to 30 mA. In this case, such an arrangement provides protection so as to prevent the current flowing through the LED string 6 from becoming 30 mA or more. That is to say, such an arrangement provides a 170 mA reduction in current consumption.

That is to say, such an arrangement is capable of setting the threshold current $I_{TH1}$, i.e., the upper limit of the current that flows through the circuit, according to the target value of the driving current $I_{DRV}$. Thus, such an arrangement provides a reduction in power consumption while safely protecting the circuit, as compared with an arrangement in which the threshold current is fixed at a high level.

The same advantage can be said of an overcurrent protection operation of the second comparator CMP2 for a current that flows through the switching transistor M1.

[Second Embodiment]

Figure 3:
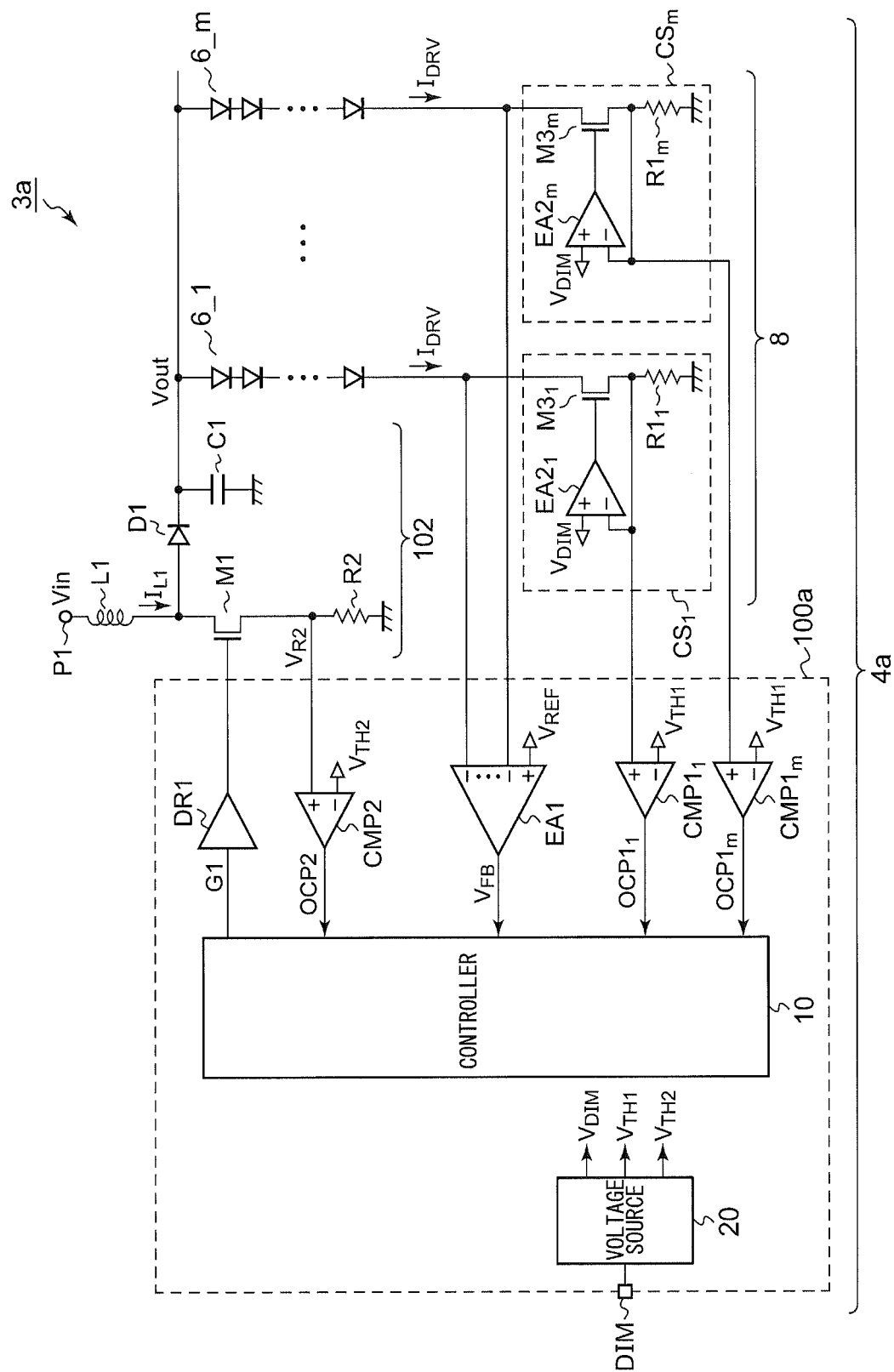
FIG. 3 is a circuit diagram which shows a configuration of a driving circuit according to a second embodiment.

FIG. 3 is a circuit diagram which shows a configuration of a driving circuit 4a according to a second embodiment. The driving circuit 4a is configured to be capable of driving multiple LED strings 6_1 through 6_m, and includes a current driver 8, in addition to the control IC 100 and the output circuit 102.

The current driver 8 includes current sources CS respectively provided to the LED strings 6. Each current source CS includes a transistor M3, a first detection resistor R1, and an error amplifier EA2. The transistor M3 and the first detection resistor R1 are arranged in series on a path of the corresponding LED string 6. The error amplifier EA2 adjusts the voltage at the control terminal of the transistor M3 such that the voltage drop $V_{R1}$ at the first detection resistor R1 matches the control voltage $V_{DIM}$. Each current source CS stabilizes the driving current $I_{DRV}$ that flows through the corresponding LED string 6 as represented by $I_{DRV}=V_{DIM}/R1$.

The error amplifier EA1 generates a feedback voltage $V_{FB}$ that corresponds to the difference between a predetermined reference voltage $V_{REF}$ and the sum total of the voltage drop across the transistor M3 and the voltage drop across the first detection resistor R1, i.e., the cathode voltage of the LED string 6. The error amplifier EA1 includes multiple inverting input terminals respectively configured to receive the cathode voltages of the multiple LED strings 6. The error amplifier EA1 amplifies the difference between the reference voltage $V_{REF}$ and the lowest of the multiple cathode voltages. The controller 10 receives the feedback voltage $V_{FB}$, and generates a gate pulse signal G1 having a duty ratio that is adjusted such that the lowest cathode voltage matches the reference voltage $V_{REF}$.

First comparators $CMP1_1$ through $CMP1_m$ are provided to the current sources $CS_1$ through $CS_m$, respectively. Each first comparator CMP1 is configured to assert a first overcurrent detection signal OCP1 when the voltage drop $V_{R1}$ across the corresponding first detection resistor R1 exceeds the first threshold voltage $V_{TH1}$.

The above is the configuration of the driving circuit 4a. Next, description will be made regarding the operation thereof.

With the driving circuit 4a shown in FIG. 3, the driving current $I_{DRV}$ is stabilized to a target value represented by $V_{DIM}/R1$, in the same way as with the driving circuit 4 shown in FIG. 2. Furthermore, the settings of the overcurrent protection threshold currents $I_{TH1}$ and $I_{TH2}$ are represented by $V_{DIM} \times K1/R1$, and $V_{DIM} \times K2/R1$, respectively. Thus, the threshold currents $I_{TH1}$ and $I_{TH2}$ are each proportional to the target value of the driving current $I_{DRV}$.

Thus, with the driving circuit 4a shown in FIG. 3, such an arrangement is capable of setting the threshold current $I_{TH1}$, i.e., the upper limit of the current that flows through the circuit, according to the target value of the driving current $I_{DRV}$, in the same way as with the driving circuit 4 shown in FIG. 2. In addition to safely protecting the circuit, such an arrangement provides a reduction in power consumption as compared with an arrangement in which the threshold current is fixed at a high level.

Description has been made regarding the present invention with reference to the embodiments. The above-described embodiments have been described for exemplary purposes only, and are by no means intended to be interpreted restrictively. Rather, various modifications may be made by making various combinations of the aforementioned components or processes. Description will be made below regarding such modifications.

In the first and second embodiments, the second threshold voltage $V_{TH2}$ may be generated as described below. In a state in which the output voltage Vout is low immediately after the control IC 100 is started up, in order to raise the output voltage Vout to a target value in a short period of time, there is a need to charge the output capacitor C1 with a relatively large amount of current. Immediately after the start-up operation, if the level of the control voltage DIM is low, and the second threshold voltage $V_{TH2}$ is thus set to a low value, such an arrangement provides overcurrent limiting by means of the second comparator CMP2, which can lead to a problem of the rising rate of the output voltage Vout being insufficient.

In order to solve such a problem, the control IC 100 may further include a start-up detection comparator configured to compare the output voltage Vout with a predetermined threshold voltage $V_{TH3}$. With such an arrangement, when the output voltage Vout is lower than the threshold voltage $V_{TH3}$, the voltage source 20 sets the second threshold voltage $V_{TH2}$ to a sufficiently high constant level so as to provide a sufficient amount of charge current, regardless of the level of the control signal DIM (control voltage $V_{DIM}$). Subsequently, when the output voltage Vout exceeds the threshold voltage $V_{TH3}$, the voltage source 20 may generate the second threshold voltage $V_{TH2}$ that is proportional to the control voltage $V_{DIM}$. Such a modification provides overcurrent protection without a tradeoff between it and the rising rate of the output voltage Vout.

Description has been made in the embodiments regarding a non-insulating switching power supply employing an inductor. Also, the present invention can be applied to an insulating switching power supply employing a transformer.

Description has been made regarding an electronic device as an application of the light emitting apparatus 3. However, the usage of the present invention is not restricted in particular. Also, the present invention can be applied to an illumination device and so forth.

The settings of the logical signals, such as the high-level state and the low-level state of the logical signals, have been described in the present embodiments for exemplary purposes only. The settings can be freely modified by inverting the signals using inverters or the like.

While the preferred embodiments of the present invention have been described using specific terms, such description is for illustrative purposes only, and it is to be understood that changes and variations may be made without departing from the spirit or scope of the appended claims.

What is claimed is:

1. A driving circuit configured to supply a driving voltage and a driving current to a light emitting element, the driving circuit comprising:
    a first detection resistor arranged on a path of the light emitting element;
    a voltage source configured to receive a control signal indicating a target luminance level of the light emitting element, to generate a control voltage and a first threshold voltage according to the control signal, wherein the control voltage has a level that corresponds to the target luminance level and the first threshold voltage is proportional to the control voltage;
    a controller configured to generate a gate pulse signal having a duty ratio that is adjusted such that the voltage drop across the first detection resistor matches the control voltage;
    a driver configured to drive, according to the gate pulse signal, a switching power supply configured to generate the driving voltage; and
    a first comparator configured to assert a first overcurrent detection signal when the voltage drop across the first detection resistor exceeds the first threshold voltage, so as to stop a switching operation of the switching power supply.

2. A driving circuit according to claim 1, wherein the voltage source is configured to further output a second threshold voltage that is proportional to the control voltage, and wherein the driving circuit further comprises:
    a second detection resistor arranged on a path of a switching element of the switching power supply; and a second comparator configured to assert a second overcurrent detection signal so as to turn off the switching element when a voltage drop across the second detection resistor exceeds the second threshold voltage.

3. A driving circuit according to claim 2, wherein, when the driving voltage is lower than a predetermined third threshold voltage, the voltage source fixes the second threshold voltage at a constant level that is independent of the control voltage, and when the driving voltage exceeds the third threshold voltage, the voltage source outputs the second threshold voltage that is proportional to the control voltage.

4. A driving circuit according to claim 1, wherein the voltage source comprises:
   a buffer configured to receive a control signal which represents the target luminance level; and
   a plurality of resistors arranged in series between the buffer and a ground terminal,
   and wherein the voltages that occur at connection nodes that connect the plurality of resistors are respectively output as the first threshold voltage and the control voltage.

5. A driving circuit configured to supply a driving voltage and a driving current to a light emitting element, the driving circuit comprising:
   a voltage source configured to receive a control signal indicating a target luminance level of the light emitting element, to generate a control voltage and a first threshold voltage according to the control signal, wherein the control voltage has a level that corresponds to the target luminance level, and the first threshold voltage is proportional to the control voltage;
   a transistor and a first detection resistor arranged in series on a path of the light emitting element;
   an error amplifier configured to adjust the voltage at a control terminal of the transistor such that voltage drop across the first detection resistor matches the control voltage;
   a controller configured to generate a gate pulse signal having a duty ratio that is adjusted such that the sum total of the voltage drop across the transistor and the voltage drop across the first detection resistor matches a predetermined reference voltage;
   a driver configured to drive, according to the gate pulse signal, a switching power supply configured to generate the driving voltage; and
   a first comparator configured to assert a first overcurrent detection signal so as to stop a switching operation of the switching power supply when the voltage drop across the first detection resistor exceeds the first threshold voltage.

6. A driving circuit according to claim 5, wherein the voltage source is configured to further output a second threshold voltage that is proportional to the control voltage,
   and wherein the driving circuit comprises:
      a second detection resistor arranged on a path of a switching element of the switching power supply; and
      a second comparator configured to assert a second overcurrent detection signal so as to turn off the switching element when a voltage drop across the second detection resistor exceeds the second threshold voltage.

7. A driving circuit according to claim 5, wherein, when the driving voltage is lower than a predetermined third threshold voltage, the voltage source fixes the second threshold voltage at a constant level that is independent of the control voltage, and when the driving voltage exceeds the third threshold voltage, the voltage source outputs the second threshold voltage that is proportional to the control voltage.

8. A driving circuit according to claim 5, wherein the voltage source comprises:
   a buffer configured to receive a control signal which represents the target luminance level; and
   a plurality of resistors arranged in series between the buffer and a ground terminal,
   and wherein the voltages that occur at connection nodes that connect the plurality of resistors are respectively output as the first threshold voltage and the control voltage.

9. A light emitting apparatus comprising:
a light emitting element; and
a driving circuit configured to supply a driving voltage and a driving current to the light emitting element,
wherein the driving circuit comprises:
   a first detection resistor arranged on a path of the light emitting element;
   a voltage source configured to receive a control signal indicating a target luminance level of the light emitting element, to generate a control voltage and a first threshold voltage according to the control signal, wherein the control voltage has a level that corresponds to the target luminance level, and the first threshold voltage is proportional to the control voltage;
   a controller configured to generate a gate pulse signal having a duty ratio that is adjusted such that the voltage drop across the first detection resistor matches the control voltage;
   a driver configured to drive, according to the gate pulse signal, a switching power supply configured to generate the driving voltage; and
   a first comparator configured to assert a first overcurrent detection signal when the voltage drop across the first detection resistor exceeds the first threshold voltage, so as to stop a switching operation of the switching power supply.

10. An electronic device comprising:
a liquid crystal panel; and
a light emitting apparatus arranged as a backlight of the liquid crystal panel,
wherein the light emitting apparatus comprises:
   a light emitting element; and
   a driving circuit configured to supply a driving voltage and a driving current to the light emitting element,
   and wherein the driving circuit comprises:
      a first detection resistor arranged on a path of the light emitting element;
      a voltage source configured to receive a control signal indicating a target luminance level of the light emitting element, to output a control voltage and a first threshold voltage according to the control signal, wherein the control voltage has a level that corresponds to the target luminance level, and the first threshold voltage is proportional to the control voltage;
      a controller configured to generate a gate pulse signal having a duty ratio that is adjusted such that the voltage drop across the first detection resistor matches the control voltage;
      a driver configured to drive, according to the gate pulse signal, a switching power supply configured to generate the driving voltage; and
      a first comparator configured to assert a first overcurrent detection signal when the voltage drop across the first detection resistor exceeds the first threshold voltage, so as to stop a switching operation of the switching power supply.

* * * * *